April 26, 1949.  E. J. WELLS  2,468,581

DIAL MICROMETER

Filed Aug. 27, 1945

INVENTOR.
Earl J. Wells
BY
ATTORNEY

Patented Apr. 26, 1949

2,468,581

UNITED STATES PATENT OFFICE 2,468,581

DIAL MICROMETER

Earl J. Wells, Comptche, Calif.

Application August 27, 1945, Serial No. 612,830

4 Claims. (Cl. 33—147)

This invention relates to a new and improved micrometer device, particularly one intended for the measurement of slots, flanges and the like so positioned or of such size that the usual and ordinary micrometer cannot be employed.

It is the generally broad object of the present invention to provide a new and improved micrometer device useful for the measurement of slots, flanges and the like positioned in such a manner or of such a size that the usual and ordinary micrometer cannot be employed.

A further object of the present invention is to provide a simple, rugged, micrometer construction.

A further object of the present invention is to provide a micrometer structure in which a screw and nut are provided, the relative movement between the two being applied to an indicator arm movable over a calibrated dial mounted on the nut with the arm turned by the screw.

The invention includes other objects and features of advantage, some of which, together with the foregoing, will appear hereinafter wherein a present preferred form of construction of the micrometer of this invention is disclosed.

Referring to the drawing accompanying and forming a part hereof,

Figure 1:
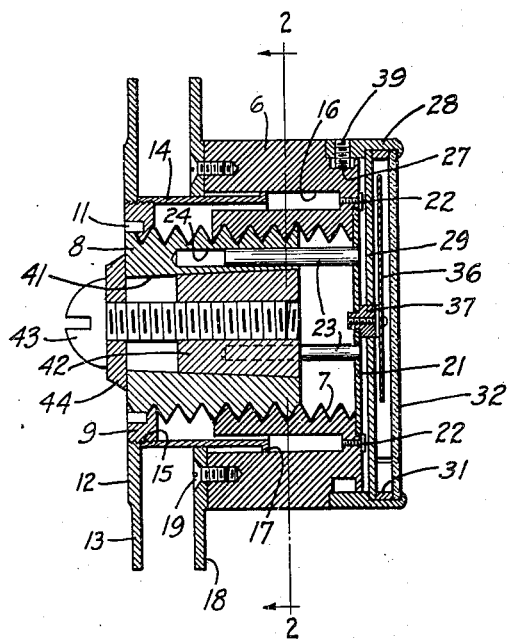
Figure 1 is a side elevation partly in section of a micrometer constructed in accordance with this invention.
Figure 4:
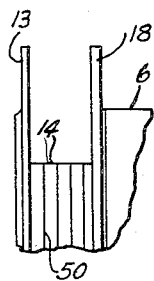
Figure 4 is a fragmentary side elevation of the assembled micrometer.
Figure 2:
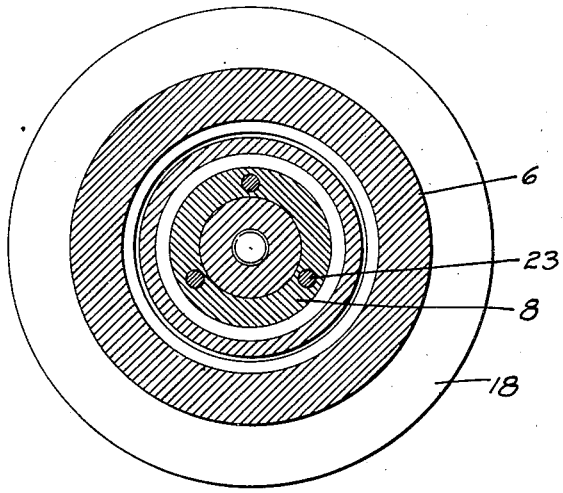
Figure 2 is a section taken along the line 2—2 of Figure 1.

Referring particularly to Figure 1, the body of the micrometer is made up of the circular nut 6 having a thread 7 formed thereon. Screw 8 is cooperatively threaded, the thread being such that ten threads to the inch are provided so that each complete rotation of the screw relative to the nut results in 0.1 of an inch of lineal axial movement of the screw with respect to the nut.

To provide a seal about screw 8, threaded ring 9 is secured on the end of screw 8, a plurality of pins 11 securing the ring in position on the screw. Ring 9 is threaded as at 15 to receive an annular flange 12 which extends outwardly, the flange being relieved about its outer periphery as at 13 to permit utilization of a minimum thickness of the flange for purposes of measurement. Also secured upon threaded portion 15 of ring 9 is an annular sleeve 14 which extends forwardly in the same direction as the screw into an annular recess 16 formed in nut 6. The end of the sleeve 14 is flanged as at 17 to ride along and fit closely against the outer surface of the annular recess 16 and provide a seal between the screw and the nut.

A second annular measuring flange 18 is secured as by screws 19 to the adjacent face on nut 6 cooperatively adjacent to flange 12. Flange 18 extends over a portion of the annular recess 16, preventing withdrawal of screw 8 from nut 6 so long as the sleeve is screwed onto ring 9.

Means are provided for indicating the extent of rotation of the screw with respect to the nut. In the form of device shown in the drawing, this means comprises plate 21 mounted for rotation in a recess in nut 6. Screws 22 spaced about the periphery of the recess retain the plate in position. Plate 21 carries three pins 23 which extend from the plate into the several receptacles 24 in screw 8 in slideable relation therewith.

Nut 6 is provided with an annular recess 27 in which is rotatably mounted collar 28 carrying a dial 29 retained in place by a spacer ring 31. A suitable glass cover 32 is positioned over the dial, the peripheral edge of the ring 28 being crimped over to retain the cover glass in place between the crimped rim and the spacer ring.

Figure 3:
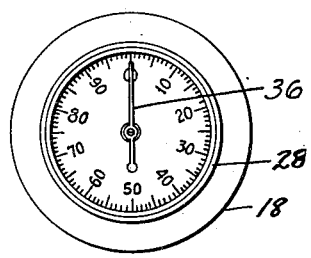
Figure 3 is a plan view of the assembled micrometer.

The dial is calibrated, usually in major divisions of tenths and minor divisions each equal to one-hundredth as appears in Figure 3. An indicator arm 36 is mounted by stem 37 on plate 21.

The zero position of the dial is adjusted by releasing one or more screws 39 from engagement with the recess 27 and moving the dial to zero position in which the screw and nut are in full threaded position with flanges 12 and 18 in engagement. If one then moves the screw relative to the nut, the distance of travel between the inner faces on flanges 13 and 18 will be indicated on the dial. The width of a shoulder of only slight extent on a shaft for example, can be readily determined, by moving the screw from the nut until the flanges just fit the shoulder.

The dial reading indicates fractional movement of a tenth of an inch or less. To permit an accurate reading of measurements greater than those provided for on the dial face, the surface of sleeve 14 is formed with a plurality of spaced concentric rings 50 spaced along the sleeve at 0.1 inch intervals. The reading on the dial plus the number of exposed rings will indicate the spacing between the flanges. By adding the flange thickness to this reading, one can measure the distance across the flanges.

To take care of wear, the screw is preferably made hollow, the passage therein being indicated at 41 and being conical. A conical plug 42 is provided. A screw 43 is engaged with the plug, a washer 44 fitting over the end of the passage 41. If one tightens screw 43, the conical plug will be drawn in to the screw and the screw expanded so that a fit of the desired tightness can be secured.

I claim:

1. A micrometer comprising a nut, a first annular flange fixed on one end of said nut, a dial positioned at the other end of said nut, a plate mounted on one side of said dial and rotatable in said nut, an indicator arm movable over the other side of said dial by said plate, a screw rotatably mounted for rotation in said nut, a second annular flange fixed on one end of said screw, and a plurality of pins secured to said plate, each pin extending from the plate into a cylindrical receptacle therefor in said screw to rotate said plate and said indicator arm as said screw is moved into and out of said nut.

2. A micrometer comprising a nut, a first annular flange fixed on one end of said nut, a dial positioned at the other end of said nut, a plate mounted on one side of said dial and rotatable in said nut, an indicator arm movable over the other side of said dial by said plate, a screw rotatably mounted for rotation in said nut, a second annular flange fixed on one end of said screw, an annular recess in said nut, a cylindrical member secured to said screw and fitting into said annular recess to provide a protecting seal about said screw, and a plurality of pins secured to said plate, each pin extending from the plate into a cylindrical receptacle therefor in said screw to rotate said plate and said indicator arm as said screw is moved into and out of said nut.

3. A micrometer comprising a nut, a first annular flange fixed on one end of said nut, a dial positioned at the other end of said nut, a plate mounted on one side of said dial and rotatable in said nut, an indicator arm movable over the other side of said dial by said plate, a screw rotatably mounted for rotation in said nut, said screw having a conical passage formed centrally thereof, a conical plug in said passage, means for moving said plug in said passage to expand said screw in said nut to control the fit of said screw in said nut, a second annular flange fixed on one end of said screw, and a plurality of pins secured to said plate, each pin extending from the plate into a cylindrical receptacle therefor in said screw to rotate said plate and said indicator arm as said screw is moved into and out of said nut.

4. A micrometer comprising a nut, a first annular flange fixed on one end of said nut, a dial positioned at the other end of said nut, a plate mounted on one side of said dial and rotatable in said nut, an indicator arm movable over the other side of said dial by said plate, a screw rotatably mounted for rotation in said nut, said screw having a conical passage formed centrally thereof, a conical plug in said passage, means for moving said plug in said passage to expand said screw in said nut to control the fit of said screw in said nut, a second annular flange fixed on one end of said screw, an annular recess in said nut, a cylindrical member secured to said screw and fitting into said annular recess to provide a protecting seal about said screw, and a plurality of pins secured to said plate, each pin extending from the plate into a cylindrical receptacle therefor in said screw to rotate said plate and said indicator arm as said screw is moved into and out of said nut.

EARL J. WELLS.

REFERENCES CITED

The following references are of record in the file of this patent:

UNITED STATES PATENTS

| Number | Name | Date |
| --- | --- | --- |
| 620,337 | Lavigne | Feb. 28, 1899 |
| 676,637 | Spalding | June 18, 1901 |
| 790,665 | Spalding | May 23, 1905 |
| 799,533 | Clark | Sept. 12, 1905 |
| 1,307,816 | Garbin | June 24, 1919 |
| 1,463,321 | Jacobson | July 31, 1923 |
| 1,617,005 | Ames | Feb. 8, 1927 |